May 15, 1951 R. J. MELCHER 2,552,686
COAXIAL CONNECTOR WITH PRESSURE SEALING
Filed July 31, 1948
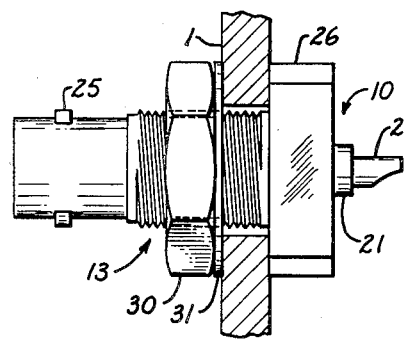
*Fig. I*
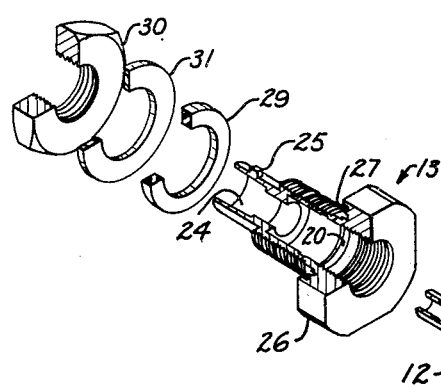
*Fig. II*
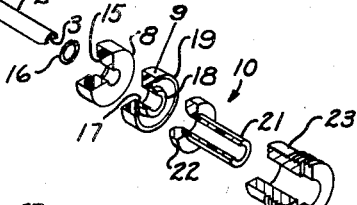
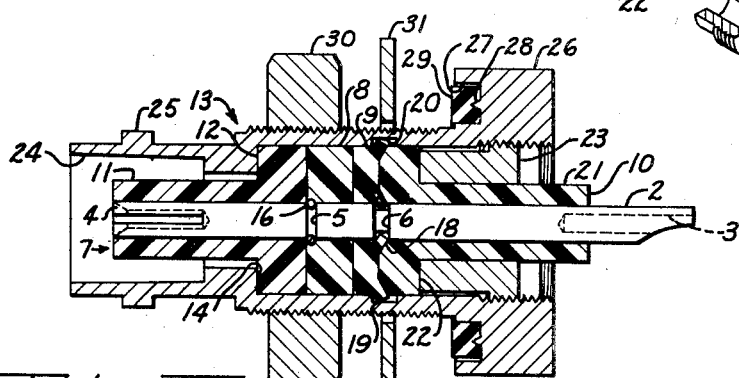
*Fig. III*
INVENTOR.
Robert J. Melcher
BY
Marshall, Marshall & Leonard
ATTORNEYS Patented May 15, 1951

2,552,686

UNITED STATES PATENT OFFICE 2,552,686

COAXIAL CONNECTOR WITH PRESSURE SEALING

Robert J. Melcher, Toledo, Ohio, assignor to H. H. Buggie & Company, Toledo, Ohio, a corporation of Ohio Application July 31, 1948, Serial No. 41,741

4 Claims. (Cl. 174—153)

This invention relates to coaxial connectors particularly designed for use with radio, radar, and television components and having provision for moisture and pressure proofing of the connectors.

In radio, radar and television installation many electrical connections must be made with coaxial cables in order to seal the central conductor and thus to prevent interferences from being received in the circuits carried by the central conductor. Where these units are designed for shipboard, aircraft or for outdoors use it is necessary that the actual components be enclosed in waterproof and, preferably, pressure-proof containers so that no damage will result to the relatively delicate electronic equipment in event of immersion in water or sudden change in atmospheric pressure. Since each unit or component of the radio, radar, or television equipment usually is separate in its own closed container, it is necessary to provide means for connecting the separate components in circuit with each other. Where coaxial cables are employed for these connections the leads must be carried through the walls of the component cases by pressure-proof and moisture-proof connecting means.

It is the principal object of this invention to provide a coaxial connector for carrying a coaxial connection through the wall of a housing, which connection is moisture-proof and substantially pressure-proof.

It is another object of this invention to provide a coaxial connector in which the pressure-proof attribute results from a seal approximating the most effective sealing means as yet devised but still permitting simple and quick connection and disconnection of the elements of the device.

These objectives are realized by the employment of a rubber to metal seal where the surfaces of the rubber and metal which are in contact with each other approximate a line contact thus permitting a very tight seal with a relatively low force or pressure between the two contacting members. If, for example, it is desired to seal rubber to metal using an annular sealing surface having definite width, extremely high force must be applied between the two elements of the connector in order to insure firm contact between the rubber and the metal. Any irregularity in the surface of either the rubber or the metal, which may be almost microscopic in dimensions, breaks the perfect seal and allows the passage of moisture or the escape or entrance of gases or air.

In the drawings:

Figure I is a view in elevation of a coaxial connector embodying the invention.

Figure II is an exploded view of the elements of the connector embodying the invention showing each element partially cut away so that its specific construction can be better understood.

Figure III is a vertical sectional view on an enlarged scale of the connector in its assembled condition.

In Figure I there is shown in cross section a fragmentary portion of a wall 1 through which a connector embodying the invention is used to transmit electrical impulses. The inner side of the wall 1 is at the right in Figure I and the inner end of a central connector 2 is shown. As can better be seen in Figures II and III the inner end of the connector 2 is provided with a bore 3 for the reception of a pin jack or similar connection means. The connector 2 at its outermost end is split into a plurality of parts 4 and also counterbored to provide a receptacle having a considerable transverse resiliency for the reception of a similar pin jack or other connection means. Approximately midway along its length the connector 2 is provided with an annular groove 5 having a semicircular cross section and a second annular groove 6 which has a rectilinear cross section.

The connector 2, when assembled in the device, is surrounded by a plurality of washers and beads, an outer bead 7, an insulator 8, a specially formed washer 9 and an inner bead 10 which cooperates with the washer 9. The outer bead 7 is preferably molded from a relatively hard plastic material such as a polystyrene resin. The outer bead 7 has a tubular portion 11 which is center bored to closely fit the exterior of the outer end of the connector 2. The bead 7 is provided with a thick flange 12 through which the center boring continues and the outer diameter of which is substantially equal to the inner diameter of a tubular body 13. The body 13 is provided with a radially extending annular shoulder 14 against which the outer side of the flange 12 of the outer bead 7 is pressed when the device is assembled.

The insulator 8 also is axially bored to fit snugly around the connector 2 and has a center bore 15 adapted to receive a snap ring 16 which fits into the annular groove 5 when the device is assembled. The insulator 8 also preferably is molded from a relatively hard plastic material such as polystyrene.

The washer 9 is preferably molded from butyl rubber and is designed with an axially extending center bore 17 which snugly fits around the connector 6 and a pair of concentric axially extending flanges 18 and 19, the flange 18 being located immediately circumjacent the connector 2 and the flange 19 being located at the outer edge of the washer 9. The body 13 has an annular groove 20 cut in the inner surface and positioned therein at the same distance from the shoulder 14 as the distance of the annular groove 6 in the connector 2 when the device is assembled. The connector 2 is maintained in proper relative longitudinal position by the inner cooperation of the snap ring 16 with the adjacent shoulders of the bore in the outer bead 7 and the counterbore 15 in the insulator 8.

The inner bead 10 also preferably is molded from polystyrene plastic and, like the outer bead 7, has a tubular portion 21 and a flanged portion 22. The outer face of the flanged portion 22, however, does not extend on a flat plane perpendicular to the axis of the device, but is formed with a wedge shaped cross section, the apex of the wedge extending outwardly between the two flanges 18 and 19 of the washer 9. The inner end of the bore in the body 13 is threaded to receive a tubular spanner nut 23 for locking the parts in assembled position.

As can best be seen in Figure III, when the parts are assembled around the connector 2 and in the bore in the body 13, the spanner nut 23 is screwed in place and tightened (toward the left in Figure III) to clamp all of the parts 7, 8, 9 and 10 tightly together longitudinally. This forces the flanges 18 and 19 inwardly and outwardly respectively into the annular grooves 6 (in the connector 2) and 20 (in the body 13). The wedging action of the outer end of the bead 10 stretches the butyl rubber washer 9 forcing the flanges tightly over the sharp outer edges of the annular grooves 6 and 20 and establishing almost a line contact between the metal of the connector 2 and body 13 with the rubber of the washer 9 in the flanges 18 and 19 respectively.

The body 13 is provided with a conical bore 24 at its outermost end for the reception of a connector plug which may be so designed as to be held in place by engagement with a bayonet fitting 25 formed on the outside of the body. At the inner end of the body 13 there is provided a heavy outwardly extending flange 26 in which is cut an annular groove 27 having a sharp edged ridge 28 at its bottom. The groove 27 receives a gasket 29 formed of rubber or similar material which is tightly squeezed against the inner surface of the wall 1 by a large locking nut 30 threaded on the exterior of the body 13 and normally positioned on the outer side of the wall 1. A locking washer 31 also is provided and when the device is in position on a panel is located on the exterior side of the panel.

The success of this connector device depends to a very large extent upon one basic principle. This principle, as briefly outlined above, is that the most effective seal can be made between metal and rubber, for example, if the flexible material, i. e., the rubber, can be tightly forced over a knife edge, preferably as close as possible to a line contact. Theoretically, a line contact, having no width at all, would be the most perfect type of seal, but, of course, no matter how sharp the knife edge is made, it must have some thickness. In practical construction it has been found that a flat of from .001 to .003 inch is effective in providing an extremely tight seal without cutting into the rubber like material of which the sealing washer 9 is molded. Inasmuch as an outer member, i. e., the body 13, must be sealed to a central member, i. e., the connector 2, the actual sealing between these members to prevent passage of moisture or gases requires that some element extend radially of the device. The device can be sealed radially easily by the mere provision of a moisture and pressure-proof radially extending member such as a diaphragm or a simple washer but the real problem in sealing occurs where the washer or diaphragm must be sealed to the metal body and connector. The washer or diaphragm cannot be provided with either inwardly or outwardly extending flanges which could be locked between relatively movable members on both the connector and body without requiring that each of these members (the connector and body) be formed in two or more parts which are movable relative to each other. This system of sealing would permit, of course, the outer edge and the inner edge of the diaphragm or washer to be tightly grasped by the two parts of the body and the connector respectively. Such a construction, however, would require many more parts and would be difficult to machine and assemble. In the instant device the same advantage of sealing plus the added advantage that the actual contact between the rubber gasket and metal parts is reduced as nearly to a line contact as is practically possible, has produced a simple, easily assembled coaxial connector in which all of the parts can be relatively easily manufactured.

A connector embodying this invention was subjected to a pressure leakage test as follows: The connector was placed in the wall of a pressure container having less than 150 cubic inches of volume and with an interior air pressure of 30 pounds per square inch, absolute. The container and the connector were then placed in a temperature chamber. The temperature within the chamber was reduced from room to —55° C. over a period of approximately four or five hours. The temperature was then held at —55° C. for four hours and after the expiration of the four hours was gradually raised to +95° C. and held at that temperature for an additional four hours. The temperature was then decreased to room temperature. The entire test was run over a period of time slightly more than twenty-four hours and at the conclusion of the test the loss in pressure within the pressure container was less than .5 pound per square inch.

The efficacy of the sealing means in a connector embodying the invention not only is shown by the remarkable pressure test outlined above, but also is demonstrated by the fact that after assembly of the device, although there are no interlocking parts to prevent rotation of the connector 2 relative to the body 13, yet so tightly does the sealing washer grasp the metal edges against which it is compressed, that the contact does not rotate under a torque of 6 inch ounces.

These remarkable results accruing from such a simple structure are traceable almost in their entirety to the novel sealing provided by the engagement of the rubber sealing washer 9 with the substantially knife edge corners of the two annular grooves 6 and 20.

Having described the invention, I claim:

1. A coaxial connecting device for use in the wall of an electrical component container, comprising, in combination, a tubular body extending through an opening in the wall of said container, means for sealing said body to the wall of said container, a center-bored sealing washer, a pair of spaced annular flanges on said washer, one of said flanges being located circumjacent the center bore and the other of said flanges being located at the outer edge of said washer, the outer diameter of said washer being substantially equal to the inner diameter of said body, said body having a relatively sharp-edged annular groove in its inner wall, means for positioning said washer with the outer one of said flanges overlapping the groove in said body, a connector extending through the center bore of said washer and having a similar sharp-edged annular groove cut in its exterior surface, means for positioning said connector with its annular groove located radially from the annular groove in said body, annular wedge means extending axially between said flanges and clamping means for forcing said wedge means between said flanges whereby said flanges are forced radially into the grooves in said body and said connector and against corresponding sharp edges thereof.

2. In a coaxial connecting device having a tubular body extending through and sealed to an opening in an electrical component container and a coaxially located connector extending through said body, the improvements in pressure sealing means comprising, a washer having an axial bore fitting the exterior of said connector and an outer surface fitting the interior of said body, a pair of spaced, annular, axially-extending flanges on one face of said washer, there being a circumferentially extending groove in the inner surface of said body and a similar groove in the exterior surface of said connector, and wedge-shaped clamping means for forcing one of said flanges into each of said grooves and against corresponding edges of said grooves.

3. In a coaxial connecting device having a tubular body extending through and sealed to an opening in an electrical component container and a coaxially located connector extending through said body, the improvement in pressure sealing means comprising, a washer having an axial bore fitting the exterior of said connector and an outer surface fitting the interior of said body, a pair of spaced, annular, axially-extending flanges on one face of said washer, one of said flanges extending circumjacent said connector and the other being located at the outer edge of said washer, said body having an annular groove in its interior surface, said connector having a similar groove in its exterior surface, means for positioning said washer and said connector with the grooves radially spaced from each other and with said flanges partially overlying said grooves, an annular member having a wedge-shaped face on one side adjacent said flanges and directed between said flanges and clamping means located within said body for forcing the wedge-shaped face between said flanges whereby said flanges are displaced inwardly and outwardly respectively into said grooves and against corresponding edges thereof.

4. Pressure sealing means for a connecting device having a tubular body and a coaxial, cylindrical, centrally located connector extending through said tubular body, comprising, an annular flexible sealing washer having an outer diameter substantially equal to the internal diameter of said tubular body and an inner diameter substantially equal to the exterior diameter of said connector, said washer being mounted coaxially with said tubular body and said conductor, means for positioning said washer and said conductor axially relative to said body, a pair of concentric, spaced, axially extending flanges on one face of said washer, there being an annular groove in the interior of said body and an annular groove in the exterior of said connector, each of the grooves being radially adjacent one of said flanges, an annular wedging member having a substantially frusto-conical cross section with the apex of the wedge extending between said flanges and an annular clamping nut threadably engaged with the interior of said body for moving said wedging member axially for forcing said flanges radially inward and outward respectively into the associated grooves and against corresponding edges of such grooves.

ROBERT J. MELCHER.

REFERENCES CITED

The following references are of record in the file of this patent:

UNITED STATES PATENTS

| Number | Name | Date |
| --- | --- | --- |
| 2,315,492 | Anderson et al. | Apr. 6, 1942 |
| 2,449,073 | Johonneson | Sept. 14, 1948 |
| 2,454,962 | Brown | Nov. 30, 1948 |

FOREIGN PATENTS

| Number | Country | Date |
| --- | --- | --- |
| 36,886 | Netherlands | Nov. 15, 1935 |